(12) United States Patent
Fitterer et al.

(10) Patent No.: US 9,542,430 B1
(45) Date of Patent: **\*Jan. 10, 2017**

(54) ENSURING DATA MAINTENANCE WITHIN A LDAP ENVIRONMENT

(71) Applicant: International Business Machines Corporation, Armonk, NY (US)

(72) Inventors: Annemarie R. Fitterer, Austin, TX (US); Richard J. Smith, Round Rock, TX (US); Rama Mohan Thulasi Reddy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,833

(22) Filed: May 20, 2016

Related U.S. Application Data

(63) Continuation of application No. 15/015,636, filed on Feb. 4, 2016, now Pat. No. 9,396,285, which is a
(Continued)

(51) Int. Cl.
*G06F 17/30* (2006.01)
*G06F 11/30* (2006.01)

(52) U.S. Cl.
CPC ..... *G06F 17/30368* (2013.01); *G06F 11/3051* (2013.01); *G06F 17/3051* (2013.01); *G06F 17/30353* (2013.01); *G06F 17/30554* (2013.01)

(58) Field of Classification Search
None
See application file for complete search history.

(56) References Cited

U.S. PATENT DOCUMENTS 5,974,470 A * 10/1999 Hammond .......... G06F 9/44521
707/999.202
7,624,096 B1 11/2009 Harvey
(Continued)

OTHER PUBLICATIONS

Internet Society Request for Comment (RFCS), "Lightweight Directory Access Protocol (LDAP) Client Update Protocol (LCUP) (RFC3928)", An IP.com Prior Art Database Technical Diclosure, Original Publication Date: Oct. 1, 2004, IP.com No. 000032056, 2004, pp. 1-32.
(Continued)

*Primary Examiner* — Tyler Torgrimson
(74) *Attorney, Agent, or Firm* — Gilbert Harmon, Jr.

(57) ABSTRACT

An approach for tracking system changes to support data maintenance within a directory service environment. Log fields are added to a directory service database for applications that interface with a directory service environment based on predetermined fields to be tracked. The log fields are updated to register database schema fields and data associated with the applications to create a history of changes. An application's identity and data access to the directory service environment are monitored and the log fields are updated to create a history of usage. The directory service database history of usage and changes are periodically analyzed to determine applications relationship dependencies and usage information. Associated maintenance actions are identified by detecting conditions in the directory service environment, based on predetermined maintenance criteria and maintenance is performed.

1 Claim, 5 Drawing Sheets

Related U.S. Application Data continuation of application No. 14/927,558, filed on Oct. 30, 2015.

(56) References Cited

U.S. PATENT DOCUMENTS

| | | |
|---|---|---|
| 7,698,255 B2 | 4/2010 | Goodwin et al. |
| 8,601,121 B2 | 12/2013 | Kumar et al. |
| 2005/0033777 A1 | 2/2005 | Moraes et al. |
| 2005/0114401 A1 | 5/2005 | Conkel |
| 2006/0062005 A1 | 3/2006 | Formanek et al. |
| 2006/0123024 A1 | 6/2006 | Sathyanarayan et al. |
| 2011/0307443 A1 | 12/2011 | Megginson |

OTHER PUBLICATIONS

Internet Society Request for Comment (RFCS) , "Lightweight Directory Access Protocol (LDAP): Schema for User Applications (RFC4519)", An IP.com Prior Art Database Technical Disclosure, Original Publication Date: Jun. 1, 2006, IP.com No. 000137183, pp. 1-37.

Fitterer et al, "Ensuring Data Maintenance Within a LDAP Environment", U.S. Appl. No. 14/927,558, filed Oct. 30, 2015, 33 pages.

Fitterer et al, "Ensuring Data Maintenance Within a LDAP Environment", U.S. Appl. No. 15/015,636, filed Feb. 4, 2016, 29 pages.

IBM, Appendix P, list of patents or patent application treated as realated, 2 pages.

\* cited by examiner

FIG. 1

| EID | DN | CREATOR | CREATOR_TIMESTAMP | ENTRYDATA | USER_APPLICATION_INFO |
|---|---|---|---|---|---|
| 5 | OU=AUSTIN, O=SAMPLE | cn=root | 2014-01-21-18.30.42 | dn: ou=Austin,o=sample ou: Austin objectclass: top organizationalUnit seealso: cn=Linda Carlsburg, ou=Austin, o=sample | BIG_LDAP:APPID10:1078:346:2015-09-29-11.23.40 \|\|OTHER_LDAP:APPID25:40:10:2013-03-11-02.10.17 |
| 9 | CN=BOWLING TEAM, OU=GROUPS, O=SAMPLE | cn=root | 2014-01-21-18.30.43 | dn: cn=Bowling team,ou=Groups,o=sample objectclass: top objectclass: groupOfNames description: Best Austin Bowling Team cn: Bowling team owner: cn=Mary Burns, ou=Austin, o=sample member: CN=NULL | BIG_LDAP:APPID10:673827:86303: 2015-09-24-14.39.04 |
| 12 | CN=JOHN DOE, OU=WIDGET DIVISION, OU=AUSTIN, O=SAMPLE | cn=admin | 2013-03-11-02.10.17 | dn: cn=John Doe,ou=Widget Division,ou=Austin,o=sample objectclass: top objectclass: person organizationalPerson cn: John Doe sn: Doe1 abc_official: X title: Mfg. Assembly seealso: cn=Mary Burns, ou=Austin, o=sample | BIG_LDAP:APPID10:44:36:2015-09-28-09.24.01 \|\|OTHER_LDAP:APPID25:20:5:2013-01-10-10.06.12 |

ENSURING DATA MAINTENANCE WITHIN A LDAP ENVIRONMENT

BACKGROUND OF THE INVENTION

The present invention relates generally to the field of directory management software, and more particularly to the field of Lightweight Directory Access Protocol (LDAP) data content and structure maintenance.

LDAP is typically implemented as part of a solution stack in a directory service environment wherein identity and access data are critical to an operating application infrastructure. Generally, the "front end" of a directory service solution stack or directory service environment is a LDAP service. LDAP provides a common language that client applications and servers use to communicate with one another. Generally, the "back end" of a directory service environment is a directory data store that contains data tables and database schema that LDAP references as communications occur.

SUMMARY

As disclosed herein, a computer program product for tracking system changes to support data maintenance within a directory service environment, the computer program product comprising: one or more computer readable storage media and program instructions stored on the one or more computer readable storage media, the program instructions comprising: program instructions to, add one or more log fields to a directory service database for one or more applications which interface with a directory service environment based on one or more predetermined fields to be tracked; program instructions to, update the one or more log fields to register one or more database schema fields and one or more associated data, associated with the one or more applications creating a history of changes wherein creating the history of changes comprises updating the one or more log fields with at least one of the one or more associated data and the one or more associated data further comprises at least one of a one or more log value strings; program instructions to, monitor at least one of one or more applications identities and one or more data access to the directory service environment wherein the one or more data access comprises at least one of the one or more log value strings wherein the one or more log value strings further comprises delimited values of at least one of application identifier, company name, read count, write count and last access timestamp; program instructions to, log the one or more log value strings for each of the one or more applications identities and the one or more data access in the one or more log fields creating a history of usage wherein creating the history of usage comprises updating the one or more log fields with at least one of the one or more data access; program instructions to, analyze at least one of the directory service database, the one or more log value strings in the history of usage and the history of changes to determine at least one of one or more relationship dependencies associated with the one or more applications, one or more usage information associated with the one or more applications and one or more maintenance actions associated with the one or more applications wherein the one or more maintenance actions is at least one of deleting unused information, rollback, backup, archive, restore and deploy changes wherein the one or more maintenance actions further comprises at least one of, adding, deleting and changing at least one of the one or more database schema fields, the one or more associated data, and the one or more data access and program instructions to, respond to detecting a condition in the directory service environment, meeting a predetermined one or more maintenance criteria and performing at least one of the one or more maintenance actions and outputting a report by at least one of an ad hoc, schedule and triggering event based on predetermined threshold value.

DETAILED DESCRIPTION

A directory service is a centralized data repository used by applications/servers to authenticate users and/or determine permissions with control data for users or interfacing applications.

Applications that interact with a directory service environment are added or removed based on acquisitions, divestitures or other business transformational events. Application changes in a directory service environment typically introduce corresponding changes to database schema and/or data. For example, changes can comprise policies, object class, attributes, and group definitions that are either modifications or new entries within a directory service environment.

When applications are removed, database schema updates and data changes become complex as database schema and data can be shared with other active applications. Analysis of directory service element usage can be performed by directory service administrators who monitor directory server error log files and related information. Directory service administrators are often unsure of the impact a change will have on existing applications and avoid deletion of unused data and database schema. With limited ability to determine usage and data relationships, there is a growth of unneeded objects over time. Unneeded directory service data and database schema growth can be caused by unmaintained objects such as, but not limited to, entity definitions, password policies, ACLs, and group memberships which affects storage demands and degrades directory service performance.

Embodiments of the present invention provide systems, methods, and computer program products for monitoring access and changes made to data and database schema so that usage patterns can be identified. The ability to deploy and rollback (e.g., undo change) directory changes within a directory service environment and across an enterprise environment is achieved by logging and monitoring directory service instance changes. It should be noted that the term 'enterprise environment', represents a plurality of directory service environments that can contain, but are not limited to, test and production instances.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
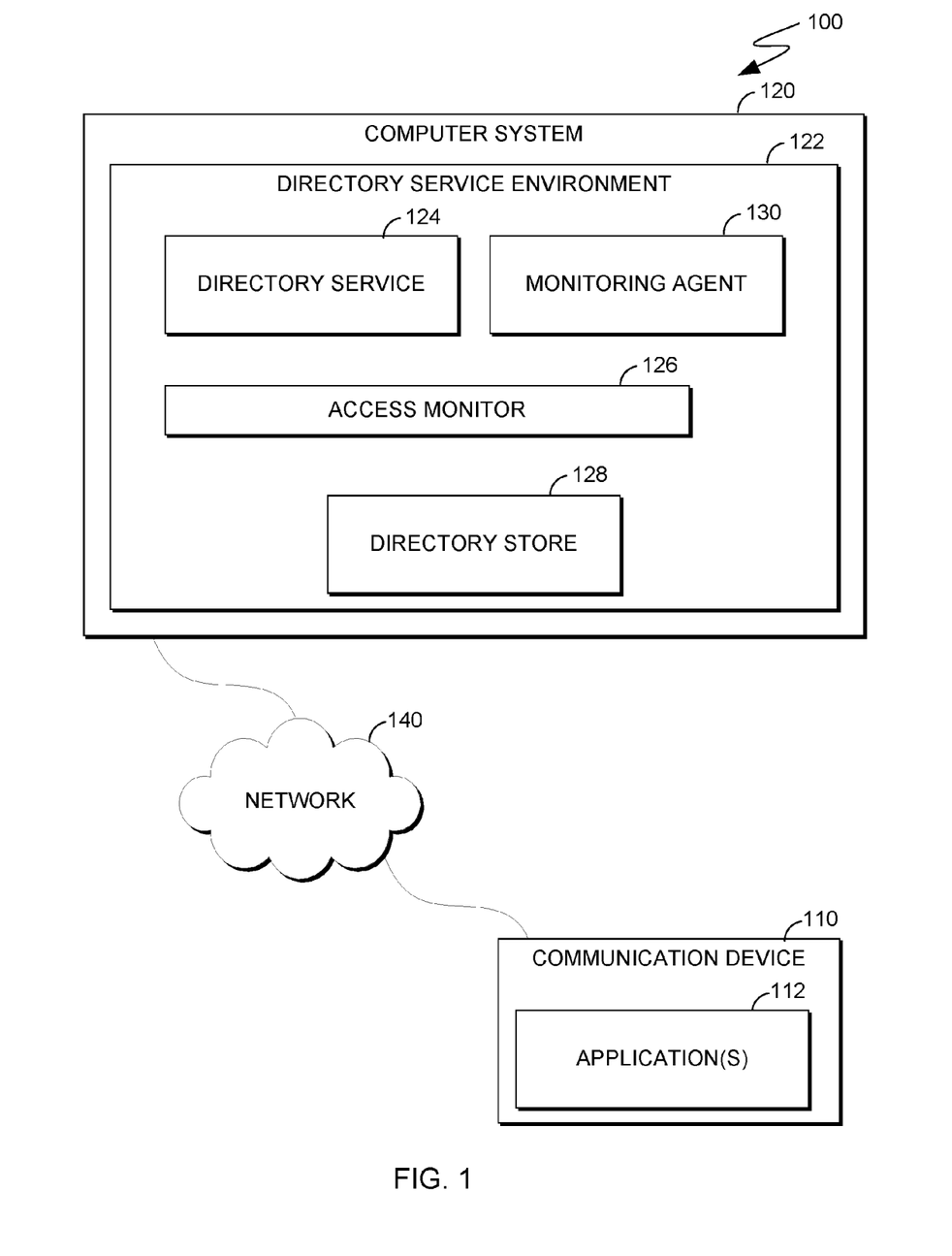
FIG. 1 is a functional block diagram illustrating a computing environment, in accordance with an embodiment of the present invention.

FIG. 1 is a functional block diagram of computing environment 100, in accordance with an embodiment of the present invention. Computing environment 100 comprises communication device 110, and computer system 120, interconnected via network 140. Communication device 110 and computer system 120 can be desktop computers, laptop computers, specialized computer servers, or the like. In certain embodiments, communication device 110 and computer system 120 represent computer systems utilizing clustered computers and components acting as a single pool of seamless resources via network 140. For example, such embodiments can be used in data center, cloud computing, storage area network (SAN), and network attached storage (NAS) applications. In general, communication device 110 and computer system 120 are representative of any electronic devices, or combination of electronic devices, capable of executing computer readable program instructions, as described in detail with regard to FIG. 5.

Network 140 can be, for example, a local area network (LAN), a wide area network (WAN) such as the Internet, or a combination of the two, and include wired, wireless, or fiber optic connections. In general, network 140 can be any combination of connections and protocols that will support communications between communication device 110 and computer system 120, in accordance with an embodiment of the present invention.

Communication device 110 comprises application(s) 112. Application(s) 112 comprises at least one of any application that accesses or binds to LDAP via anonymous or predefined permission to access data including, but not limited to, determining credential access and/or retrieving variables defined for a user or service. It should be noted that 'binding' is a term used in distributed computing environment where computers are provided credentials to establish trusted sources of different types of information. For example, a predefined permission could establish a bind using a user id and password between application(s) 112 and computer system 120.

In one embodiment of the present invention, computer system 120 comprises directory service environment 122, which further comprises directory service 124, access monitor 126, directory store 128 and monitoring agent 130. Directory service environment 122 comprises any combination of commercial or custom software products associated with operating and maintaining directory service environment 122.

In one embodiment of the present invention, directory service 124 can be a plurality of directory services 124 within directory service environment 122. Directory service 124 is a LDAP server and provides a common language that client applications and servers use to communicate with one another. Directory service 124 uses directory store 128 to provide data toward application(s) 112 in predefined formats and content.

In one embodiment of the present invention, directory store 128 can be a plurality of directory stores 128 within directory service environment 122. Directory store 128 contains database schema structure and data used by directory service 124 for application(s) 112 requests. Embodiments of the present invention include one or more columns to log application id and access information in directory store 128 records. Further database schema fields and allowed values for the schema fields include one or more columns to log application id and access information in directory store 128. Directory store 128 log column contains data such as, but not limited to, application identifier, company name, read count, write count, and last access timestamp. The inclusion of a log column to any table contained in directory store 128 enables detection of application usage and allows for controlled database schema and data content management such as, but not limited to, change deployment, removal, and rollback in directory service environment 122. Directory store 128 can be implemented using relational databases in some embodiments of the present invention, where directory store 128 can be any repository that provides structured data storage in other embodiments of the present invention.

In one embodiment of the present invention, access monitor 126 can be a plurality of access monitors 126 within directory service environment 122. Access monitor 126 sends data toward directory store 128 as application(s) 112 access directory service 124 for information. Access monitor 126 provides log information such as, but not limited to, application identifier, company name, read count, write count, and access timestamp based on directory store 128 database schema. Access monitor 126 also registers database schema used by application(s) 112 as changes made to database schema in directory store 128 using log information such as, but not limited to, application identifier, company name, read count, write count, and access timestamp.

In one embodiment of the present invention, monitoring agent 130 can be a plurality of monitoring agents 130 within directory service environment 122. Monitoring agent 130 operates on a predetermined interval or ad hoc (as needed by a directory service administrator). Monitoring agent 130 accesses directory store 128 to track changes and determine maintenance actions associated with directory service environment 122. Monitoring agent 130 can be configured to identify data which is not accessed based on predetermine thresholds and perform archive and/or deletion as specified by the directory service administrator. For example, if a known application is being retired, a directory service administrator could execute monitoring agent 130 to identify all data associated with the specified application, confirm if there is any data or object dependencies with other application(s) 112 and take action to delete unneeded values and/or database schema. Monitoring agent 130 can contain threshold criteria (e.g., time frame when data is considered no longer needed) and can take action such as, but not limited to, archiving and/or deletion of data or database schema, identify application dependency, or send notification to the directory service administrator.

Figure 2:
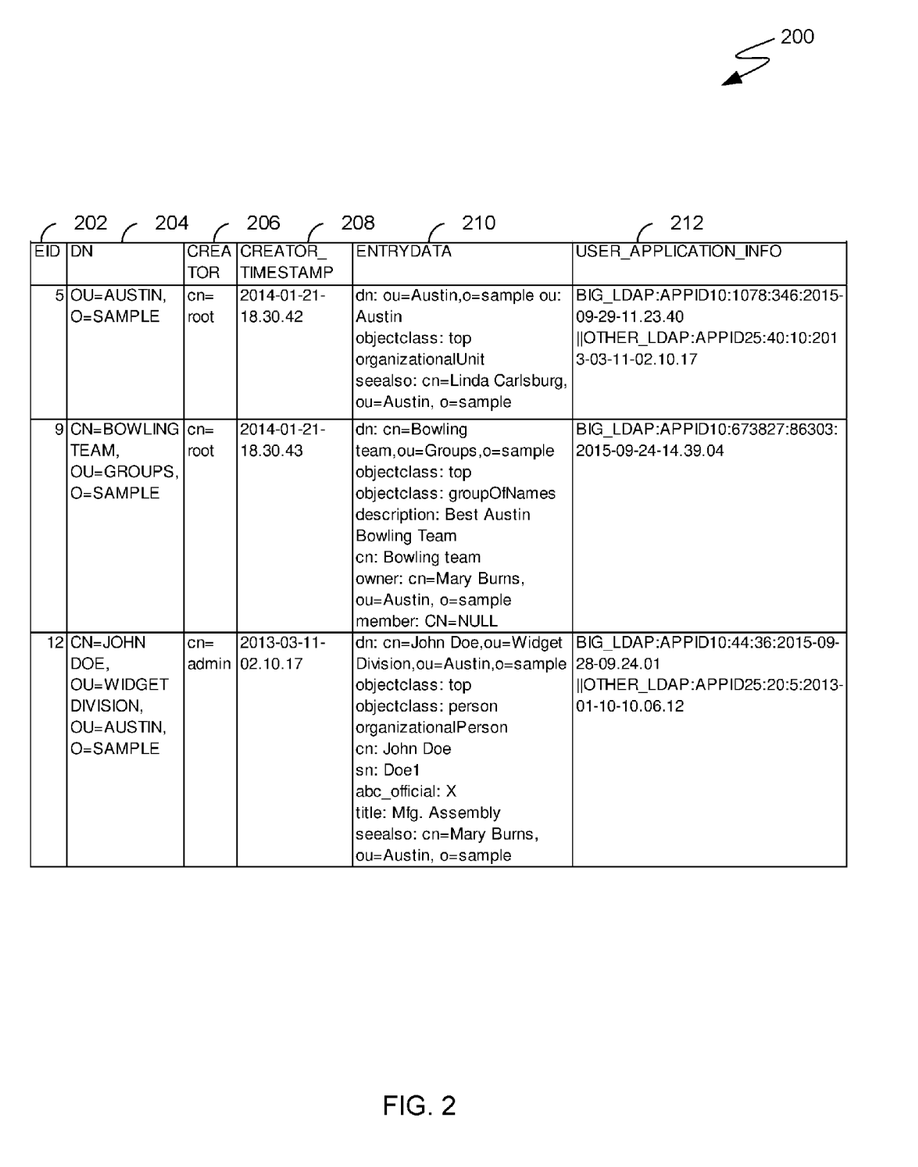
FIG. 2 depicts an example of a directory service data table with log field used for maintenance within a directory service environment, in accordance with an embodiment of the present invention.

FIG. 2 depicts an example of a directory service data table with log field used for maintenance within a directory service environment, in accordance with an embodiment of the present invention. The directory service data table 200 represents one aspect of data that can be contained in directory store 128. Heading EID 202 is a unique entry id that is assigned to each record in a directory. Heading DN 204 is a distinguished name assigned to various elements within directory store 128 data hierarchy and is used in relational data operations. Heading CREATOR 206 comprises sample values of the user that created each data record (row) in directory store 128 and heading CREATOR_TIMESTAMP 208 comprises corresponding timestamp of each row creation. Heading ENTRYDATA 210 comprises multi-value fields where each field displays various fields and values that are contained in underlying (relational) tables in directory service 124. It should be noted that directory service 124 comprises many relational tables and log fields can be applied to any underlying table to provide application usage and object change tracking in directory service 124. Heading USER_APPLICATION_INFO 212 comprises fields that enables logging of application access for each row in directory store 128.

USER_APPLICATION_INFO 212 is a multi-value, value string field. Each value string is delimited by a "||" (pipe) and each value in a value string is delimited by a ":" (colon). In one embodiment of the present invention, the data contained in a value string in USER_APPLICATION_INFO 212 is LDAP ID: application ID: read count: write count: last access timestamp. For example, USER_APPLICATION_INFO 212 for EID 202 value of 5 contains "BIG_LDAP: APPID10: 1078: 346: 2015-09-29-11.23.40||OTHER_LDAP: APPID25: 40: 10: 2013-03-11-02.10.17." The above example indicates there are two LDAP servers "BIG_LDAP" and "OTHER_LDAP" which are delimited by a 'pipe'. BIG_LDAP was accessed by "APPID10", there have been 1,078 reads, 346 writes, with a timestamp of last access of 2015-09-23-11.23.40. Note, the represented log field delimiters and data format are implementation choices and not limited by embodiments of the present invention.

Figure 3A:
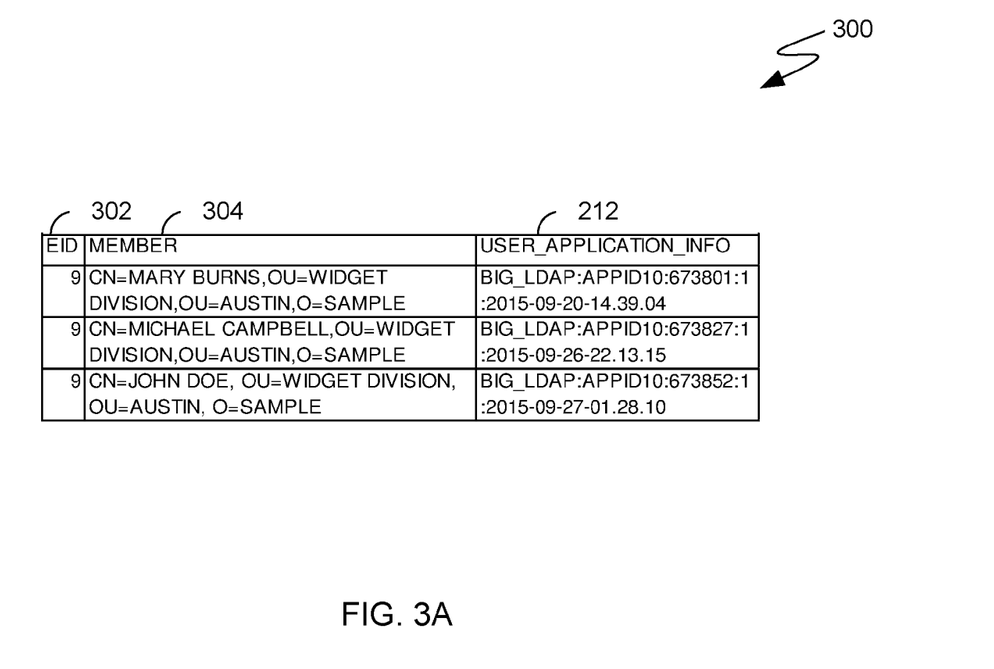
FIG. 3A depicts an example of a group in a directory service with log field used for maintenance within a directory service environment, in accordance with an embodiment of the present invention.

FIG. 3A depicts an example of a group in a directory service with log field used for maintenance within a directory service environment, in accordance with an embodiment of the present invention. The directory service group data table 300 represents one aspect of data that can be contained in directory store 128. Heading USER_APPLICATION_INFO 212 is similar to the same column identified in FIG. 2. Heading EID 302 is a relational EID field used to link with EID 202. Heading MEMBER 304 contains members of a group identified by EID 302 and associated to value 9 in EID 202. For example, John Doe in MEMBER 304 is member of "CN=BOWLING TEAM, OU=GROUPS, O=SAMPLE" from DN 204. Further, FIG. 3A indicates John Doe member record was last accessed 2015-09-27 by using APPID10.

Figure 3B:
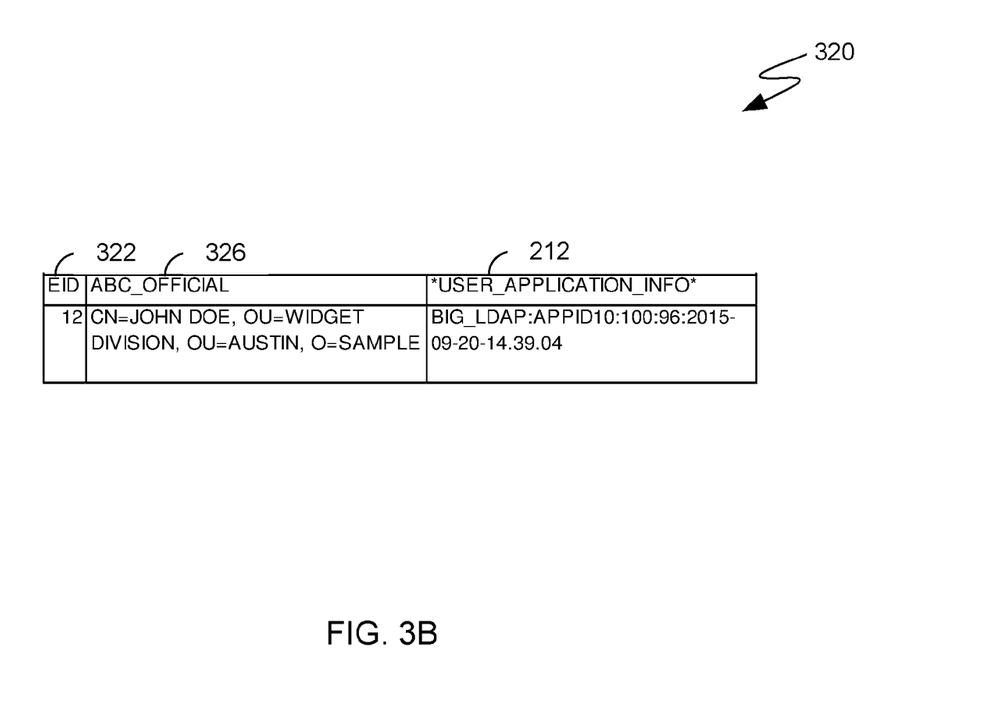
FIG. 3B depicts an example of directory service database schema with log field used for maintenance within a directory service environment, in accordance with an embodiment of the present invention.

FIG. 3B depicts an example of directory service database schema with log field used for maintenance within a directory service environment, in accordance with an embodiment of the present invention. The directory service schema table 320 is an attribute table that represents one aspect of data that can be contained in directory store 128. Heading USER_APPLICATION_INFO 212 is similar to the same column identified in FIG. 2. Heading EID 322 is a relational EID field used by ENTRYDATA 210 to present fields and values assigned to records in directory store 128. Heading ABC_OFFICIAL 326 is a data field defined in directory store 128. In this example, ABC_OFFICIAL 326 is assigned to EID 322 value 12, where ABC_OFFICIAL 326 is assigned to APP10 and was last accessed 2015-09-20. In FIG. 2 EID 202 value 12 (John Doe) reflects the ENTRYDATA 210 attribute assignment "abc_official." The example indicates John Doe is a bowling official and is a member of "Bowling team" group (MEMBER 304). In the example, APPID10 retrieves an "abc_official" attribute value from directory store 128 to provide function that may not be available to other members of the "Bowling team" group. It should be noted that fields defined in directory store 128 schema can be shared by many applications and each field used by an application is registered in USER_APPLICATION_INFO 212 separated by a 'pipe' or other delimiter.

Figure 4:
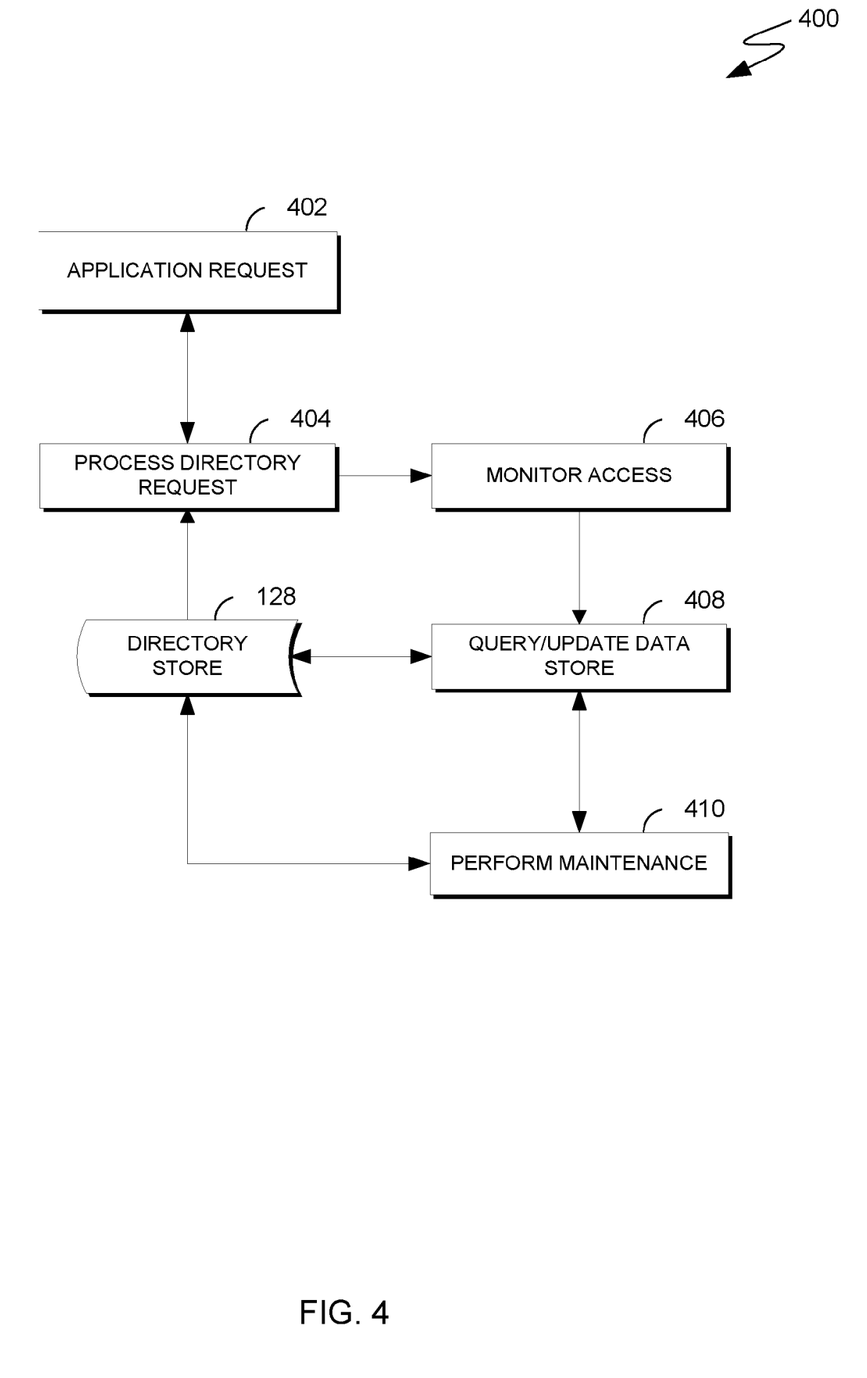
FIG. 4 is a flowchart depicting maintenance within a directory service environment, in accordance with an embodiment of the present invention.

FIG. 4 is a flow diagram depicting maintenance within a directory service environment, in accordance with an embodiment of the present invention. Step 402 application request of the directory service maintenance flow diagram 400, is a request from application(s) 112 to authenticate and/or read permissions from directory service 124.

Step 404 process directory request performs requests such as, but not limited to, user and application authentication in directory store 128. When step 404 process directory request completes a request, for example authentication is passed or failed, communication is sent toward step 402 application request for the requesting application(s) 112.

In parallel, while step 404 process directory request is accessing table rows in directory store 128, step 406 monitor access determines the identity of the requesting application(s) 112 and each table row retrieved. Application identity can be determined using information such as, but not limited to, LDAP bind data, static IP address (anonymous bind) or other attributes that uniquely identifies application(s) 112. It should be noted that embodiments of the present invention can use any identifier to uniquely identify application(s) 112 being tracked. It should be further noted that step 406 monitor access determines detailed information for each table row made by step 404 process directory request for step 408 query/update data store to perform relational database queries and changes. The table row information detail is predetermined and based on the data schema of directory store 128 and USER_APPLICATION_INFO 212 implementation data needs.

Step 408 query/update data store retrieves the USER_APPLICATION_INFO 212 field from each accessed directory store 128 table row made by step 404 process directory request and determined by step 406 monitor access. Step 408 query/update data store increments the relevant read and/or write count, retrieves the current system timestamp and store updates each affected USER_APPLICATION_INFO 212 field with a log value string similar to data depicted in FIG. 2 sample data.

Step 410 perform maintenance can be executed by a directory service administrator and/or monitoring agent 130 in an ad hoc, schedule or triggering event mode. Step 410 perform maintenance operates on directory store 128. Step 410 perform maintenance is performed on database schema and data content to add or deploy changes, delete unused information and rollback changes to directory service environment 122. Actions taken by step 410 perform maintenance can include backup, archive, and restore changes and data of directory service environment 122.

For example, new application(s) 112 requiring a new database schema attribute can be recorded in directory store 128 database schema and the application(s) 112 supporting data field(s) can be entered in directory store 128. In the prior example, a monitoring agent 130 task could be run ad hoc to create a needed database schema attribute(s) and value(s) with corresponding log value string in directory store 128 to register application(s) 112. A sample database schema log value string is shown in FIG. 3B. It should be noted that schema registration function can be used to deploy database schema and data changes to other directory service instances in an enterprise environment (e.g., from test to production).

In other scenarios, monitoring agent 130 in step 410 perform maintenance can be scheduled to provide usage analysis, notify and/or take action to automate directory services tasks. Since application usage is logged in directory store 128, monitoring agent 130 can query directory store 128 data to find information such as, but not limited to, application access activity, shared and unique fields used by application(s) 112, and unused fields or data. The ability to search which application uses which data or fields, and when or how frequently access occurs, permits a wide variety of analysis capability. With search results, step 410 perform maintenance can operate using triggering events such as, but not limited to, notifying a directory service administrator which application(s) 112 have not used directory service 124 in a predefined threshold period. For example, FIG. 2, EID 202, value 5, field USER_APPLICATION_INFO 212 indicates that APPID10 has used the directory in 2015 whereas APPID25 access stopped in 2013. In this example step 410 perform maintenance would make APPID25 a maintenance candidate. Further, step 410 perform maintenance can perform updates to directory store 128, outputting reports and/or notification to a directory service administrator, listing informational status or detailed recommended actions. Actions taken by monitoring agent 130 in step 410 perform maintenance such as, but are not limited to, delete, archive and delete, archive only, add and other maintenance combinations to support system administration needs.

Figure 5:
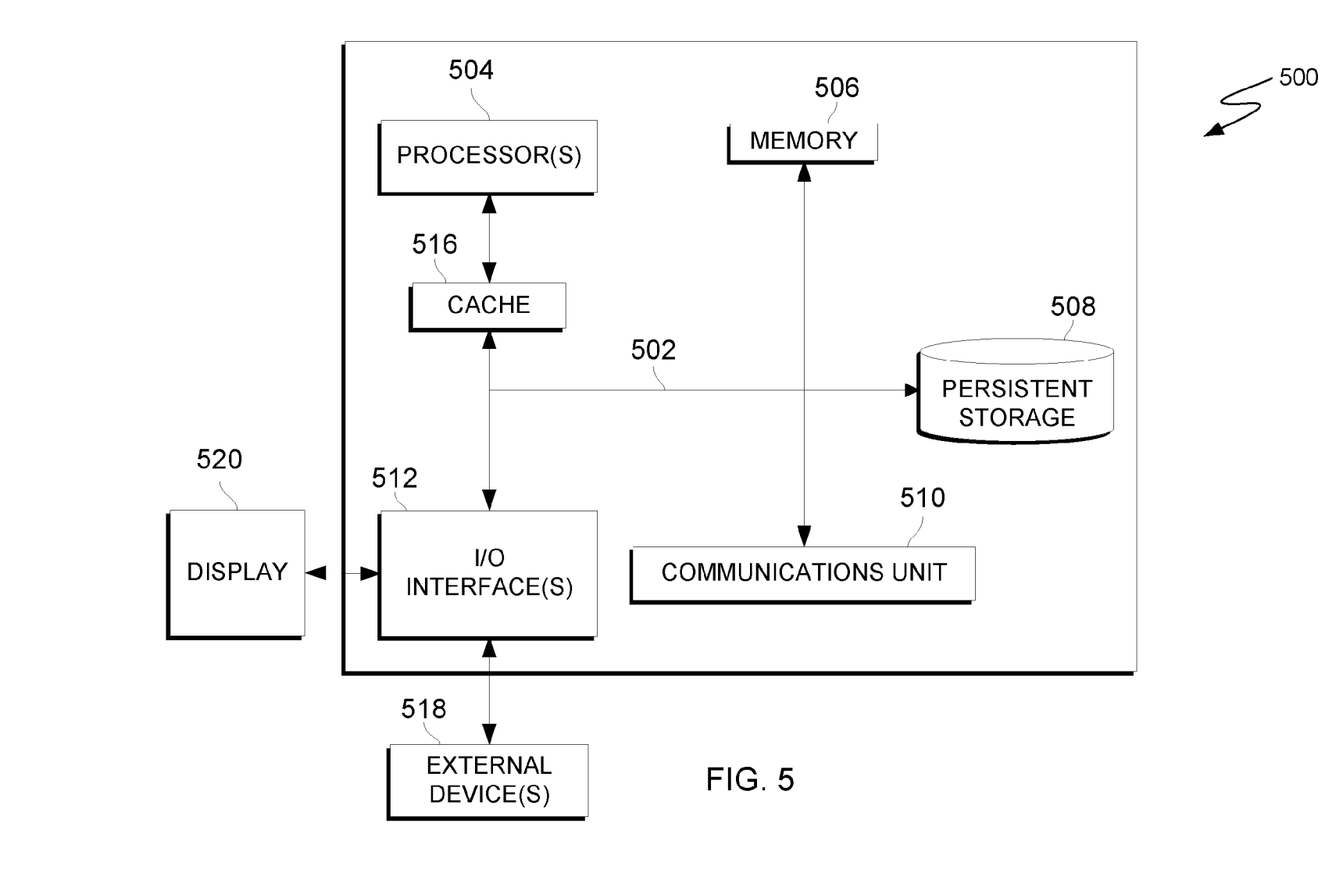
FIG. 5 depicts a block diagram of components of the server and/or the computing device, in accordance with an embodiment of the present invention.

FIG. 5 depicts a block diagram of components of communication device 110 and computer system 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Computer system 500 includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for tracking system changes to support data maintenance within a directory service environment, the computer program product comprising:

one or more computer readable storage media and program instructions stored on the one or more computer readable storage media, the program instructions comprising instructions to:

add one or more log fields to a directory service database for one or more applications which interface with a directory service environment based on one or more predetermined fields to be tracked;

update the one or more log fields to register one or more database schema fields and one or more associated data associated with the one or more applications, thereby creating a history of changes, wherein creating the history of changes comprises updating the one or more log fields with at least one of the one or more associated data and the one or more associated data further comprises at least one of a one or more log value strings;

monitor at least one of one or more applications identities and one or more instances of data access to the directory service environment, wherein the one or more instances of data access comprises access to at least one of the one or more log value strings, and wherein the one or more log value strings further comprises delimited values of at least one of application identifier, company name, read count, write count and last access timestamp;

log the one or more log value strings, for each of the one or more applications identities and the one or more instances of data access, in the one or more log fields, thereby creating a history of usage, wherein creating the history of usage comprises updating the one or more log fields with at least one of the one or more instances of data access;

analyze at least one of the directory service database, the one or more log value strings in the history of usage, or the history of changes;

determine, based on the analysis, at least one of one or more relationship dependencies associated with the one or more applications, one or more usage information associated with the one or more applications, or one or more maintenance actions associated with the one or more applications, wherein the one or more maintenance actions is at least one of: deleting unused information, rollback, backup, archive, restore, or deploy changes, wherein the one or more maintenance actions further comprises at least one of: adding, deleting, or changing at least one of the one or more database schema fields, the one or more associated data, or the one or more instances of data access; and respond to detecting a condition in the directory service environment that meets a predetermined one or more maintenance criteria by performing at least one of the one or more maintenance actions and outputting a report by at least one of an ad hoc, schedule, or triggering event based on a predetermined threshold value.

\* \* \* \* \*